United States Patent [19]

Ream et al.

[11] Patent Number: 4,614,654
[45] Date of Patent: Sep. 30, 1986

[54] TAFFY-LIKE CHEWING GUM CONFECTION AND METHOD

[75] Inventors: Ronald L. Ream, N. Aurora; David M. Moore, Wheaton; Christine L. Corriveau, Orland Pk., all of Ill.

[73] Assignee: Wm. Wrigley Jr. Company, Chicago, Ill.

[21] Appl. No.: 643,952

[22] Filed: Aug. 24, 1984

[51] Int. Cl.$^4$ ............................................. A23G 3/30
[52] U.S. Cl. .......................................... 426/5; 426/660
[58] Field of Search ............................ 426/3-6, 426/658, 660, 103

[56] References Cited

U.S. PATENT DOCUMENTS

| | | |
|---|---|---|
| 2,197,919 | 4/1940 | Bowman . |
| 2,460,698 | 2/1949 | Lindhe . |
| 2,559,648 | 7/1951 | Lindhe . |
| 3,020,164 | 2/1962 | Forkner ................................ 426/5 |
| 3,062,662 | 11/1962 | McDonald . |
| 3,208,405 | 9/1965 | Beer . |
| 3,262,784 | 7/1966 | Bucher . |
| 3,477,394 | 11/1969 | Tidwell . |
| 3,969,513 | 7/1976 | Cononne . |
| 4,150,161 | 4/1979 | Rudolph et al. . |
| 4,271,199 | 6/1981 | Cherukuri et al. . |
| 4,352,824 | 10/1982 | Puglia et al. . |
| 4,409,244 | 10/1983 | Cherukuri et al. ................ 426/4 |
| 4,491,596 | 1/1985 | Elias ..................................... 426/5 |

FOREIGN PATENT DOCUMENTS

| | | | |
|---|---|---|---|
| 0086769 | 8/1983 | European Pat. Off. | ............ 426/3 |
| 0083151 | 8/1972 | Japan | ............................ 426/3 |
| 0007868 | 4/1979 | Japan | ............................ 426/3 |

*Primary Examiner*—Jeanette Hunter
*Attorney, Agent, or Firm*—Willian Brinks Olds Hofer Gilson & Lione Ltd.

[57] ABSTRACT

A substantially homogeneous and non-crystalline taffy-like chewing gum confection having extended flavor and sweetness release characteristics comprises chewable gum base dispersed in a pliable taffy composition. The taffy composition comprises dry sugar in a weight ratio of sugar to syrup not exceeding about 2:1 and preferably a humectant such as sorbitol in an amount constituting from about 1.5% to about 5% by weight of the taffy composition. The product has an initial soft, chewy and taffy-like consistency. The taffy-like chewing gum confection, is prepared by heating a carbohydrate syrup having a moisture level within the range of from about 7% to 15% by weight of the syrup and dispersing gum base in the heated syrup.

31 Claims, No Drawings

TAFFY-LIKE CHEWING GUM CONFECTION AND METHOD

BACKGROUND OF THE INVENTION

1. Field of the Invention

This invention relates generally to candy chewing gum compositions, and, in particular, to substantially homogeneous and non-crystalline taffy-like chewing gum confections having extended flavor-release characteristics and to a method for manufacturing such confections.

2. Description of the Prior Art

Lindhe U.S. Pat. No. 2,460,698 discloses a hard candy-like chewing gum prepared by mixing gum base with boiled sugar or candy in its hot liquid state wherein the boiled sugar is cooked to a reduced moisture level of 10%, preferably less than 5%, before the hot liquid dehydrated sugar is combined with gum base. The resultant confection is a breakable, hard candy-like chewing gum confection having a tendency to crunch and fracture.

Cherukuri U.S. Pat. No. 4,271,199 discloses a sugar-containing chewing gum which has a short nougat-like or fondant-like structure formed of gum base and a preformed recrystallized combination of liquid and solid sweeteners.

DESCRIPTION OF THE INVENTION

The present invention is directed to a substantially homogeneous and non-recrystallized taffy-like chewing gum confection with extended flavor and sweetness characteristics and to a method for manufacturing the confection.

The confection of the present invention exhibits an unusual glassine appearance unlike conventional chewing gum or bubble gum. The confection has an initial and intermediate consistency and mouth-feel similar to that of a soft, chewy, non-brittle and pliable taffy. After extended mastication, the product converts to conventional chewing gum or bubble gum. The initial taffy-like texture of the confection is unlike that of standard chewing gum or bubble gum, and also distinguishes the confection from conventional brittle or hard-candy preparations having a gum base component.

During mastication of the gum confection to a final inedible chewing gum mass, the confection of the present invention exhibits unexpected extended flavor and sweetness release characteristics differing markedly from those of conventional chewing gum. The unexpected flavor and sweetness properties of the gum confection are believed to result from the substantially non-recrystallized structure of the confection. Without limiting the invention to a particular theory, it is believed that the confection structure is an amorphous or polymer-like matrix from which soluble flavor and sweetness components in the confection are released more slowly during mastication than soluble components in conventional chewing gum in which a crystalline structure is predominant.

The chewing gum confection of the present invention comprises chewable gum base dispersed in a pliable taffy composition comprising a carbohydrate syrup having a moisture level within the range of from about 7% to about 15%, preferably about 9%, by weight of the syrup. Such a moisture level is necessary to achieve the taffy-like consistency of the final gum confection. The term "carbohydrate syrup" is intended to cover starch conversion syrups such as sucrose syrup, corn syrup, glucose syrup and fructose syrup.

A conventional chewing gum base is used in the present invention in an amount constituting from about 5% to about 30%, and preferably about 11%, by weight of the confection. As used herein, the term "chewing gum base" includes bubble gum base.

The taffy composition preferably incorporates a dry sugar component in a weight ratio of sugar to syrup not exceeding about 2:1, the preferred ratio being approximately 1.3:1. The term "dry sugar" as used herein refers to sucrose, dextrose, fructose, lactose, etc. Alternatively, a high-fructose corn syrup may be utilized in the taffy composition instead of dry sugar in approximately the same weight ratio.

Preferred taffy compositions comprise glucose syrup in an amount constituting from about 30% to about 37% and dry sugar in an amount constituting from about 52% to about 62% by weight of the taffy composition. Specifically, the taffy composition of Example I below comprises about 32% by weight glucose and about 59% by weight dry sugar. In an alternative preferred formulation using high-fructose corn syrup instead of dry sugar, the taffy composition comprises 62% by weight high-fructose corn syrup and about 38% by weight glucose; see Example III below.

Preferably, a humectant, such as sorbitol, in powder or solution form is included in the taffy composition in the range of from about 1.5% to about 5.0% by weight thereof to enhance the texture of the confection. It is believed possible that the humectant also contributes to the polymer-like and substantially non-crystalline nature of the confection, thus enhancing its unexpected prolonged flavor and sweetness taste characteristics.

The taffy composition is prepared by heating the carbohydrate syrup to a temperature above about 200° F. but not exceeding about 265° F. If the syrup has an initial moisture level above a selected moisture level within the previously stated range of from about 7% to about 15% by weight, the syrup is cooked until its moisture level is reduced to the desired level within that 7% to 15% range. With a syrup moisture level in that range, the ultimate confection will set to a taffy-like or plastic (as opposed to a hard candy) consistency when cooled to room temperature. If used, the dry sugar, high-fructose corn syrup and the humectant are preferably added to the syrup before heating.

Before the gum base is added to, and dispersed in, the heated syrup, the syrup is cooled to a temperature below what is sometimes referred to as the gum base "off-note temperature", that is, the temperature at which the gum base undergoes substantial degradation. If the gum base has not been previously melted prior to introduction into the heated syrup, the temperature of the heated syrup must be high enough to melt the gum base. It is important that the temperature of the heated syrup be high enough to prevent substantial syrup recrystallization upon addition of the gum base to the syrup. The temperature to which the syrup is cooled prior to addition of the gum base should be within the range from about 200° F. to 225° F.; a preferred temperature is about 212° F.

Conventional amounts of softeners and colors, if used, are preferably added to the heated syrup prior to the addition of the gum base. Flavoring agents in conventional amounts are preferably the last ingredients added to the mixture. The entire mixture is cooled and packaged in accordance with conventional techniques.

A taffy-like chewing gum confection according to the present invention may be formulated in accordance with the following examples in which ingredient amounts are expressed as weight percentages.

EXAMPLE I

This Example, which is the preferred formulation, contains the following ingredient amounts expressed as weight percentages of the overall confection:

| Dry Sugar | 52.4 |
|---|---|
| Glucose | 28.3 |
| Corn Syrup Solids | 3.3 |
| Sorbitol Powder | 2.6 |
| Gum Base | 10.5 |
| Softeners | 0.9 |
| Flavoring Agents and Colors | 2.0 |

The taffy portion contains the following ingredients:

| Dry Sugar | 59.2 |
|---|---|
| Glucose | 31.9 |
| Corn Syrup Solids | 3.6 |
| Sorbitol Powder | 2.9 |
| Flavoring Agents and Colors | 2.4 |

EXAMPLE II

In this Example the confection has a softer chew and superior flavor release, although the confection tends to become tacky when stored. The ingredient amounts are percentages of the overall confection.

| Dry Sugar | 29.4 |
|---|---|
| Glucose | 29.4 |
| Water | 14.7 |
| Sorbitol Powder | 0.8 |
| 80% Sorbitol Solution | 2.4 |
| Gum Base | 19.6 |
| Softeners | 1.2 |
| Flavoring Agents | 2.4 |
| Colors | 0.1 |

EXAMPLE III

In this Example the confection has more mild sweetness and flavor characteristics. The ingredient amounts are weight percentages of the overall confection.

| Glucose | 33.9 |
|---|---|
| Hi-fructose Corn Syrup | 54.5 |
| Gum Base | 8.4 |
| Softeners | 0.8 |
| Flavoring Agents | 2.3 |
| Colors | 0.1 |

We claim:

1. A substantially homogeneous taffy-like chewing gum confection with extended flavor and sweetness release characteristics which comprises gum base dispersed in a matrix of a pliable and substantially non-crystalline taffy composition comprising carbohydrate syrup having a moisture level within the range of from about 7% to about 15% by weight of the syrup, wherein the gum base constitutes from about 5% to about 30% by weight of the confection.

2. The confection of claim 1 wherein the carbohydrate syrup has a moisture level of about 9% by weight of the syrup.

3. The confection of claim 1 wherein the confection has a glassine appearance.

4. The confection of claim 1 wherein the gum base constitutes about 11% by weight of the confection.

5. The confection of claim 1 wherein the taffy composition comprises dry sugar in a weight ratio of sugar to carbohydrate syrup not exceeding about 2:1.

6. The confection of claim 5 wherein the weight ratio of dry sugar to carbohydrate syrup is about 1.3:1.

7. The confection of claim 1 wherein the taffy composition comprises glucose in an amount constituting from about 30% to about 37% and dry sugar in an amount constituting from about 52% to about 62% by weight of the taffy composition.

8. The confection of claim 1 wherein the taffy composition comprises glucose in an amount constituting about 32% and dry sugar in an amount constituting about 59% by weight of the taffy composition.

9. The confection of claim 1 wherein the taffy composition comprises high-fructose corn syrup in a weight ratio of high-fructose corn syrup to carbohydrate syrup not exceeding about 2:1.

10. The confection of claim 1 wherein the taffy composition comprises high-fructose corn syrup in a weight ratio of high-fructose corn syrup to carbohydrate syrup of about 1.3:1.

11. The confection of claim 1 wherein the taffy composition comprises glucose in an amount constituting about 38% and high-fructose corn syrup in an amount constituting about 62% by weight of the taffy composition.

12. The confection of claim 1 wherein the confection comprises a humectant in an amount within the range of from about 1.5% to 5.0% by weight of the taffy composition.

13. The confection of claim 12 wherein the humectant is sorbitol.

14. A method of manufacturing a substantially homogeneous taffy-like chewing gum confection having extended flavor release characteristics which comprises the steps of preparing a substantially non-crystalline taffy composition by heating a carbohydrate syrup having a moisture level within the range of from about 7% to about 15% by weight of the syrup, and dispersing gum base into the heated syrup composition in an amount such that the gum base constitutes from about 5% to about 30% by weight of the confection.

15. The method of claim 14 wherein the syrup has a moisture level of about 9% by weight of the syrup.

16. The method of claim 14 wherein the carbohydrate syrup has an initial moisture level above a selected moisture level within said range, and the step of heating the syrup to obtain said selected moisture level.

17. The method of claim 14 wherein the taffy composition is prepared by heating the carbohydrate syrup to a temperature above about 200° F. but not exceeding about 265° F.

18. The method of claim 17 and the step of cooling the heated syrup to a temperature low enough to prevent substantial degradation of the gum base and high enough to prevent substantial re-crystallization of the syrup upon dispersion of the gum base into the syrup.

19. The method of claim 18 wherein the heated syrup is cooled to a temperature within the range of from about 200° F. to about 225° F.

20. The method of claim 18 wherein the heated syrup is cooled to a temperature of about 212° F.

21. The method of claim 14 wherein the resultant confection has a glassine appearance.

22. The method of claim 14 wherein the gum base constitutes about 11% by weight of the confection.

23. The method of claim 14 and the step of adding dry sugar to the taffy composition in a weight ratio of sugar to syrup not exceeding about 2:1.

24. The method of claim 14 and the step of adding dry sugar to the taffy composition in a weight ratio of sugar to syrup of about 1.3:1.

25. The method of claim 14 wherein the taffy composition comprises glucose in an amount constituting from about 30% to about 37% by weight of the taffy composition, and the step of adding dry sugar to the taffy composition in an amount constituting from about 52% to about 62% by weight thereof.

26. The method of claim 14 wherein the taffy composition comprises glucose in an amount constituting about 32% by weight of the taffy composition, and the step of adding dry sugar to the taffy composition in an amount constituting about 59% by weight thereof.

27. The method of claim 14 and the step of adding high-fructose corn syrup to the taffy composition in a weight ratio of high-fructose corn syrup to carbohydrate syrup not exceeding about 2:1.

28. The method of claim 14 and the step of adding high-fructose corn syrup to the taffy composition in a weight ratio of high-fructose corn syrup to carbohydrate syrup of about 1.3:1.

29. The method of claim 14 wherein the taffy composition comprises glucose in an amount constituting about 38% by weight of the taffy composition, and the step of adding high-fructose corn syrup to the taffy composition in an amount constituting about 62% by weight thereof.

30. The method of claim 14 and the step of incorporating a humectant into the taffy composition in an amount within the range of from about 1.5% to 5.0% by weight thereof.

31. The method of claim 30 wherein the humectant is sorbitol.

* * * * *